(12) United States Patent
Chatterton et al.

(10) Patent No.: US 9,251,333 B2
(45) Date of Patent: Feb. 2, 2016

(54) WEARABLE USER DEVICE AUTHENTICATION SYSTEM

(71) Applicant: EBAY INC., San Jose, CA (US)

(72) Inventors: Geoffrey W. Chatterton, Santa Clara, CA (US); Robert Michael Voytovich, Jr., San Jose, CA (US); Ramaneek Khanna, Saratoga, CA (US); Timothy C. Nichols, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 337 days.

(21) Appl. No.: 14/014,048

(22) Filed: Aug. 29, 2013

(65) Prior Publication Data

US 2015/0067824 A1 Mar. 5, 2015

(51) Int. Cl.

| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/36 | (2013.01) |
| H04W 12/06 | (2009.01) |
| G07C 9/00 | (2006.01) |
| G06K 9/00 | (2006.01) |
| G02B 27/01 | (2006.01) |
| G06F 3/0486 | (2013.01) |
| H04L 29/06 | (2006.01) |
| G06F 3/0488 | (2013.01) |

(52) U.S. Cl.
CPC .............. *G06F 21/36* (2013.01); *G02B 27/017* (2013.01); *G06F 3/0486* (2013.01); *G06F 3/04883* (2013.01); *G06K 9/00389* (2013.01); *G07C 9/00182* (2013.01); *H04L 63/0853* (2013.01); *H04W 12/06* (2013.01); *G02B 2027/014* (2013.01); *G02B 2027/0178* (2013.01)

(58) Field of Classification Search
CPC .......... G06F 21/36; G06F 1/163; G06F 3/017
USPC ........................................ 726/4, 19
See application file for complete search history.

(56) References Cited

U.S. PATENT DOCUMENTS

| | | | |
|---|---|---|---|
| 8,430,310 B1 * | 4/2013 | Ho ........................... | G06F 21/35 235/382 |
| 8,965,460 B1 * | 2/2015 | Rao ......................... | G06F 3/005 455/566 |
| 2014/0071041 A1 * | 3/2014 | Fujimaki ............ | G02B 27/0172 345/156 |
| 2014/0337634 A1 * | 11/2014 | Starner ................. | H04L 9/3231 713/186 |

* cited by examiner

*Primary Examiner* — Andrew Nalven
*Assistant Examiner* — Quy Pham
(74) *Attorney, Agent, or Firm* — Haynes and Boone, LLP

(57) ABSTRACT

Systems and methods for authenticating a user include a wearable user device receiving a first request to access a secure system. A plurality of authentication elements are then displayed on a display device to a user eye in a first authentication orientation about a perimeter of an authentication element input area. A user hand located opposite the display device from the user eye is then detected selecting a sequence of the plurality of authentication elements. For each selected authentication element in the sequence, the wearable user device moves the selected authentication element based on a detected movement of the user hand and records the selected authentication element as a portion of an authentication input in response to the user hand moving the selected authentication element to the authentication element input area. The user is authenticated for the secure system if the authentication input matches stored user authentication information.

20 Claims, 14 Drawing Sheets

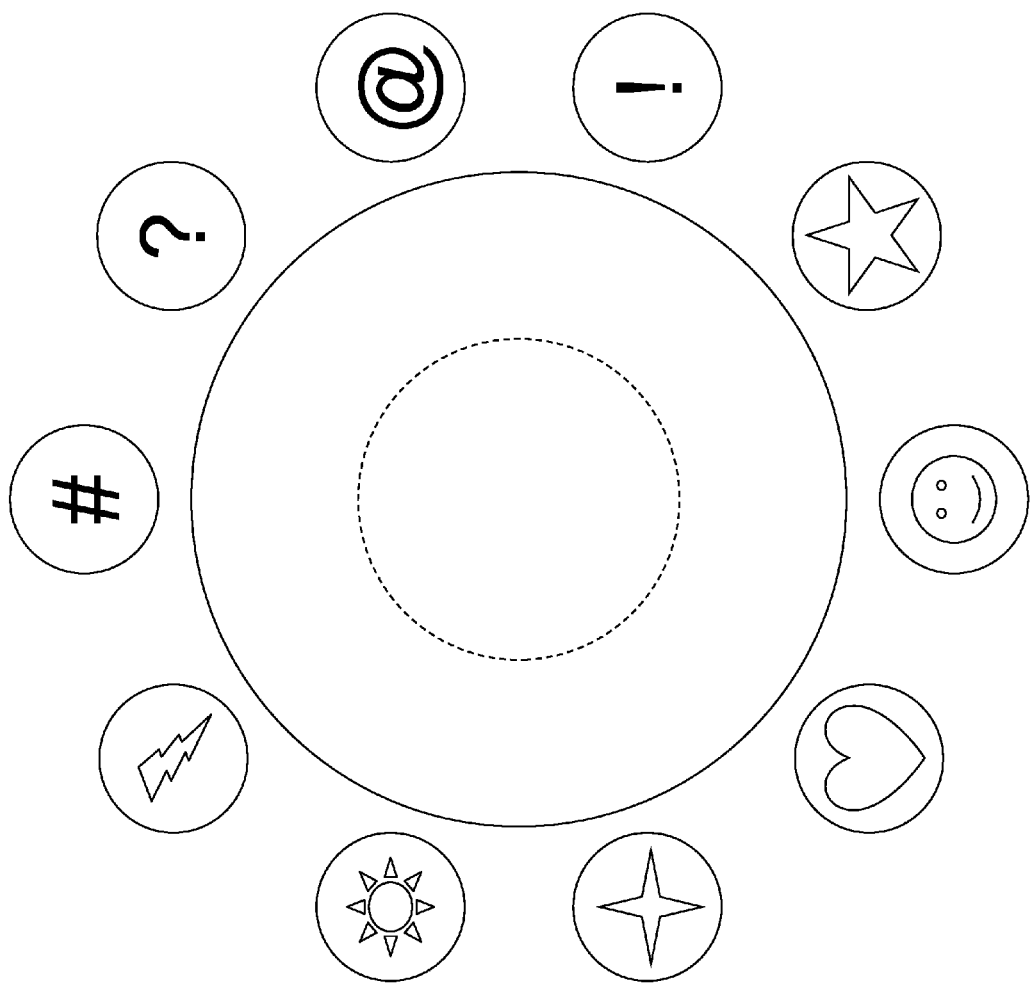

WEARABLE USER DEVICE AUTHENTICATION SYSTEM

BACKGROUND

1. Field of the Invention

The present invention generally relates to wearable user devices and more particularly to an authentication system using a wearable user device.

2. Related Art

Wearable user devices such as, for example, Google Glass® available from Google, Inc. of Mountain View, Calif., may include wearable computing devices that feature a head-mounted display device that is included on a frame, similar to an eyeglass frame, that the user wears on their head such that the display is viewable in front of at least one eye of the user. Users of such wearable user devices typically interact with the wearable user device to provide instructions by speaking those instructions aloud, and the wearable user device then uses voice recognition techniques to interpret those instructions so that they may be executed by a wearable user device. Instructions may also be provided to the wearable user device through a touchpad located on the frame that allows the user to "swipe" through a timeline-like interface provided on the display device. However, these user interface systems for providing instructions to the wearable user device suffer from a number of deficiencies, particularly when it comes to security. For example, the entering a password, passcode, or other authentication information using the wearable user device (e.g., to access functionality provided on the wearable user device) is subject to interception by a non-authorized user when spoken aloud, and is time-consuming and subject to error when entered through the touchpad.

Thus, there is a need for an improved authentication system using a wearable user device.

BRIEF DESCRIPTION OF THE FIGURES

FIG. 2b is a screen shot/user field-of-vision illustrating an embodiment of a user providing authentication information using the authentication screen displayed on the wearable user device of FIG. 2a;

FIG. 2c is a screen shot/user field-of-vision illustrating an embodiment of a user providing a authentication information using the authentication screen displayed on the wearable user device of FIG. 2a;

FIG. 2d is a screen shot illustrating an embodiment of the display of a authentication screen on a wearable user device that has been modified relative to the authentication screen displayed on the wearable user device of FIG. 2a;

FIG. 2g is a screen shot illustrating an alternative embodiment of the display of a authentication screen on a wearable user device;

FIG. 3b is a screen shot/user field-of-vision illustrating an embodiment of an authentication screen displayed on the wearable user device of FIG. 3a;

Figure 1:
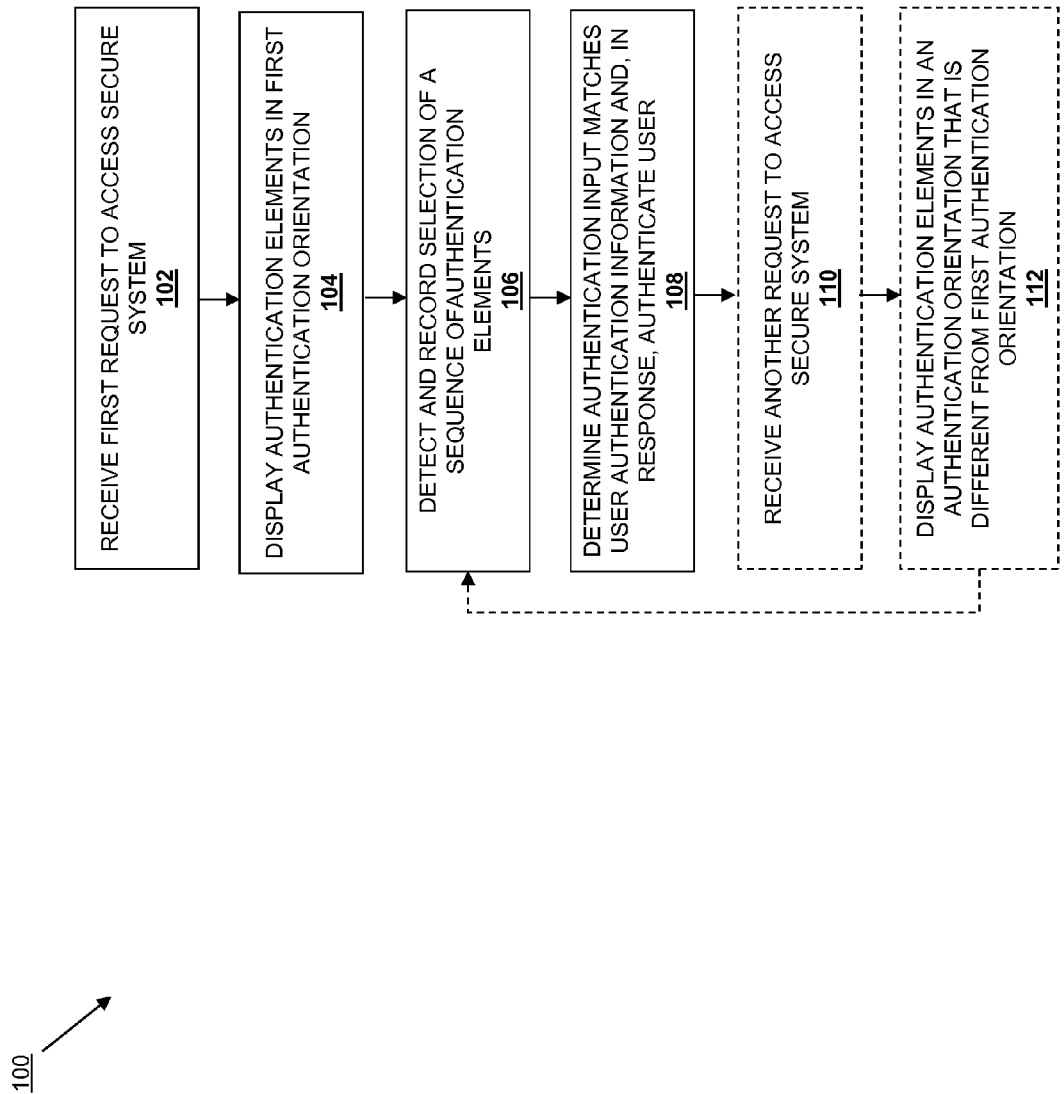
FIG. 1 is a flow chart illustrating an embodiment of a method for authenticating a user using a wearable user device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for authenticating a user using a wearable user device. The wearable user device may receive a first request from a user to access a secure system, which may be the wearable user device itself, an application provided on the wearable user device, an application function in an application provided on the wearable user device, a secure device that is in communication with the wearable user device, and/or a variety of other secure systems known in the art. In response to receiving the request to access the secure system, the wearable user device displays on its display device a plurality of authentication elements in a first authentication orientation about a perimeter of an authentication element input area. The wearable user device then detects a user hand (e.g., using a camera on the wearable user device), which is opposite the display device from the users eye, selecting a sequence of the plurality of authentication elements in the first authentication orientation by moving their hand over each selected authentication element such that the two are associated by the wearable user device, and then moving those authentication elements into the authentication element input area. If the sequence of the plurality of authentication elements provides an authentication input that matches user authentication information, the wearable user device authenticates the user for the secure system.

The wearable user device may then receive a second request from a user to access the secure system and, in response, the wearable user device displays on its display device the plurality of authentication elements in a second authentication orientation about the perimeter of an authentication element input area, with the second authentication orientation being different from the first authentication orientation. Thus, when the user selects a sequence of the plurality of authentication elements in the second authentication orientation to provide the authentication input for authentication, the user hand movements will be different than those that were used to select the sequence of the plurality of authentication elements in the first authentication orientation. As such, someone viewing the user providing an authentication input using the wearable user device cannot simply remember or record the user hand movements to copy the authentication input, as those hand movements will change depending on the authentication orientation provided for the plurality of authentication elements (which may change each time the user authenticates for the secure system.)

Referring now to FIGS. 1 and 2, an embodiment of a method 100 for authenticating a user using a wearable user device is illustrated. In the embodiments described below, a user wears a wearable user device that may enable authentication of the user in a wide variety of situations. In one embodiment, the wearable user device itself may require authentication of the user in order to access any functionality of that wearable user device. For example, the wearable user device may require authentication of the user to access an operating system on the wearable user device. In another embodiment, the wearable user device may require authentication of the user in order to access an application provided on that wearable user device. For example, the wearable user device may require authentication of the user to access a payment application, a financial tracking application, an age restricted application, and/or a variety of other applications provided on the wearable user device. In specific embodiments involving a payment application, a payment service provider such as, for example, PayPal, Inc. of San Jose, Calif. may provide a payment application that the user installs on their wearable user device, and after authentication of the user as described herein, the user may use the payment application to send instructions to the payment service provider to transfer funds from a user financial account (e.g., provided by the payment service provider, an account provider, etc.) to a merchant financial account (e.g., provided by the payment service provider, an account provider, etc.) to pay for products and/or services.

In another embodiment, the wearable user device may require authentication of the user in order to access functionality in an application provided on the wearable user device. For example, the wearable user device may require authentication of the user to charge a payment account through an application (e.g., to purchase a game on a game store application, to make a purchase on a website accessed through an Internet browser application, etc.) that is provided on the wearable user device. In another embodiment, the wearable user device may require authentication of the user in order to access a secure device that is in communication with the wearable user device. For example, the wearable user device may require authentication of the user in order to have the wearable user device provide an instruction to a secure device to unlock a lock, start-up a car, and/or provide a variety of other secure device authentication actions known in the art. However, while a number of different examples of user authentications are discussed herein, those examples are not meant to be limiting, and one of skill in the art in possession of the present disclosure will recognize that a wide variety of authentication scenarios known in the art will benefit from the teachings of the present disclosure.

Figure 2A:
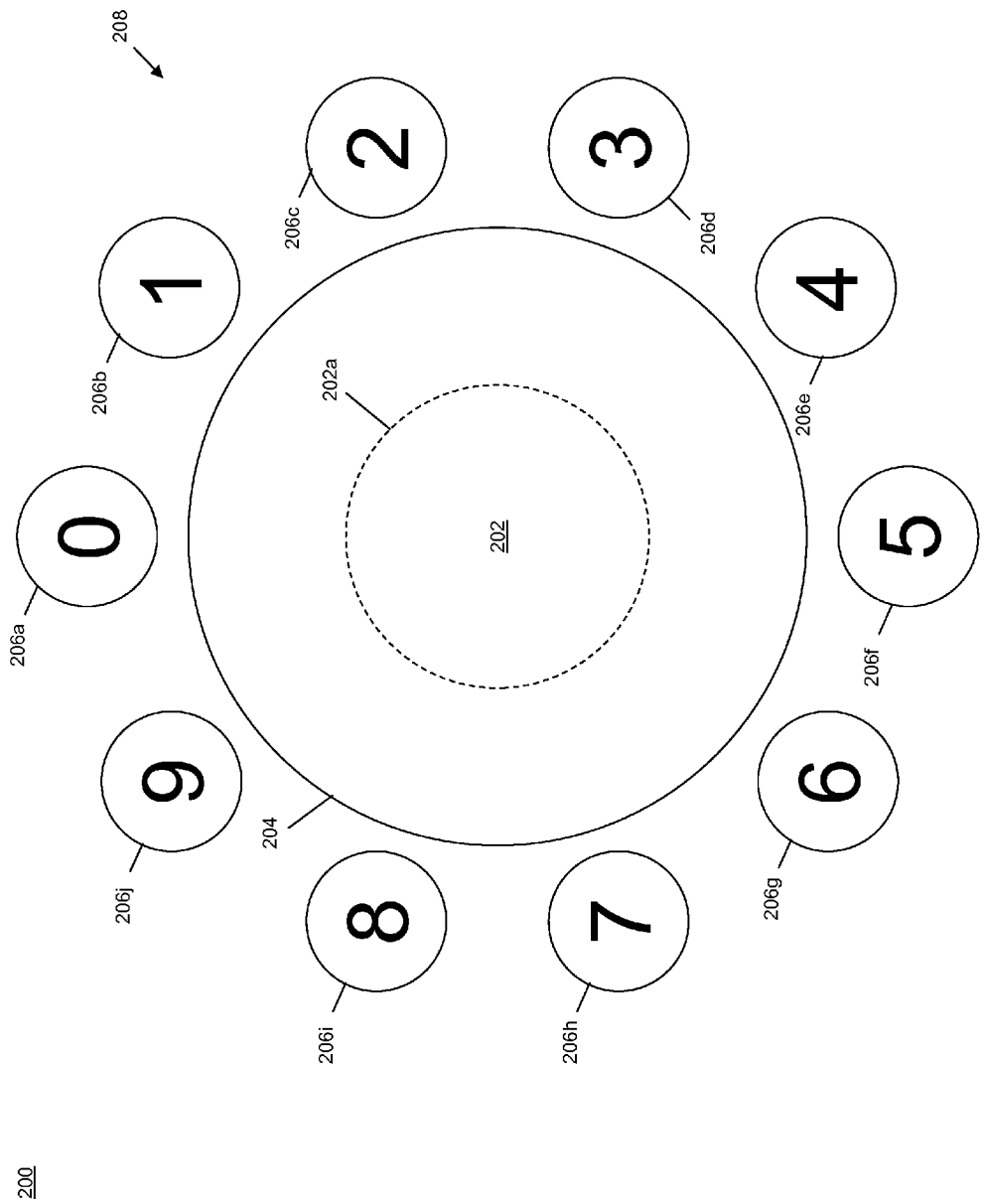
FIG. 2a is a screen shot illustrating an embodiment of the display of an authentication screen on a wearable user device.
Figure 2B:
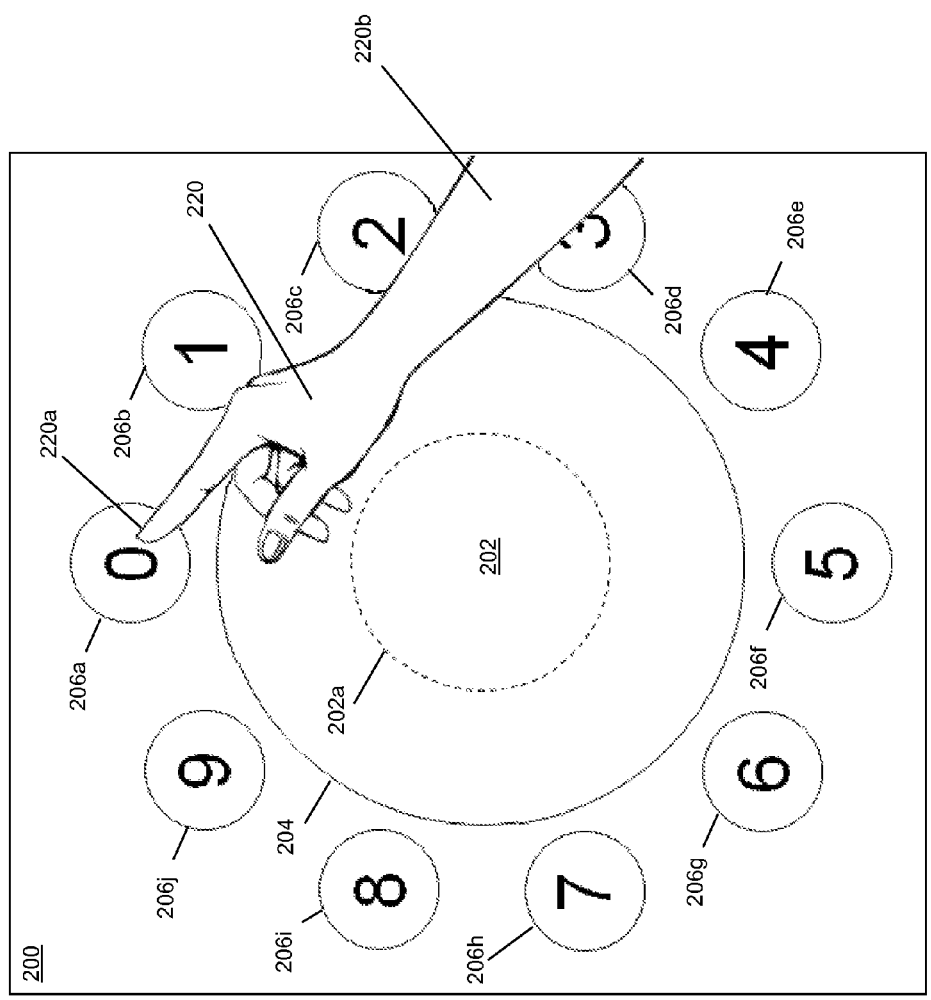
Figure 2C:
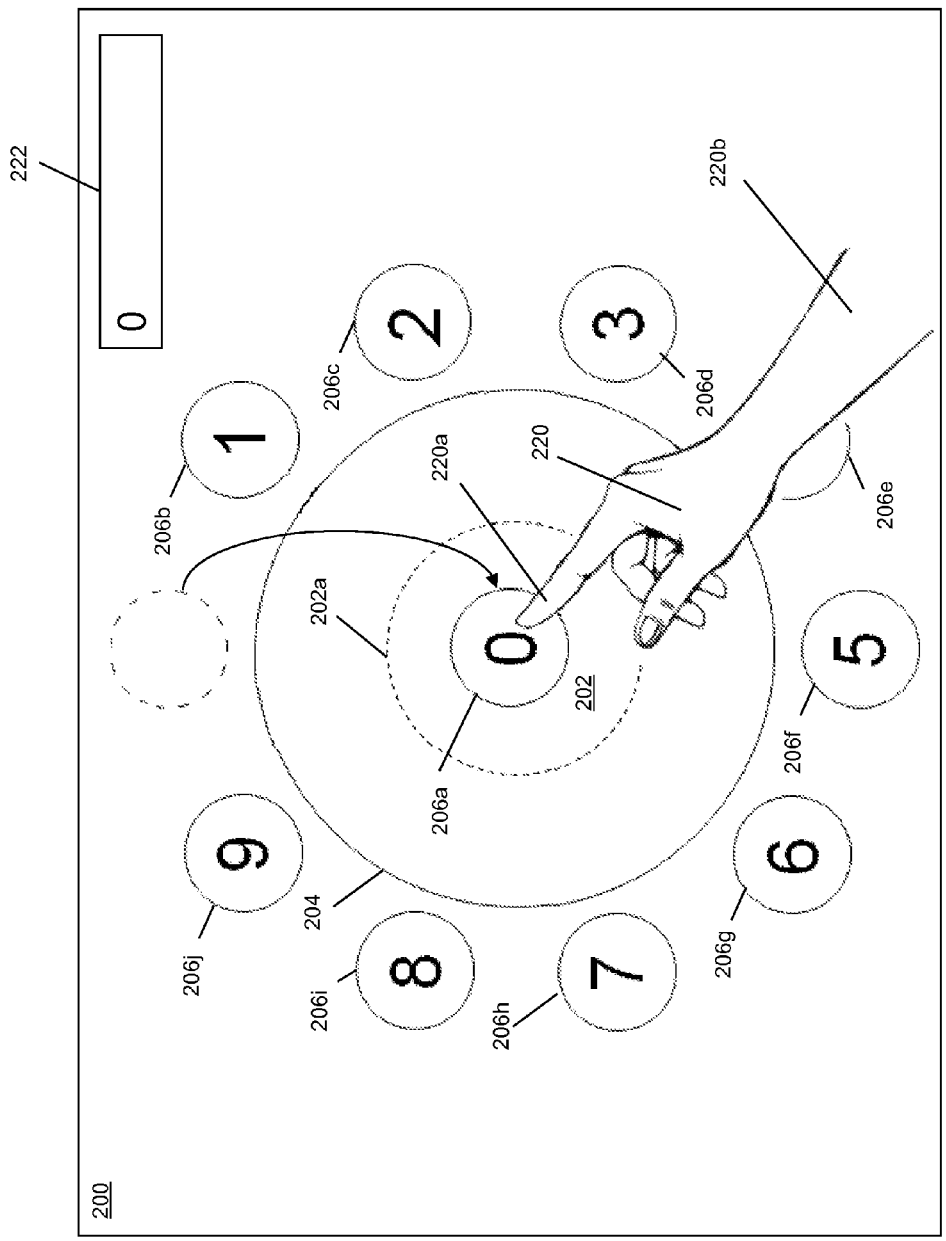

Referring first to the embodiments illustrated in FIGS. 2a-c, the method 100 begins at block 102 where a first request to access a secure system is received. At block 102, the user is wearing the wearable user device and wishes to access the functionality of the wearable user device (e.g., the operating system), an application provided on the wearable user device (e.g., a payment application), and/or functionality of an application provided on the wearable user device (e.g., the ability to make a payment on a web page accessed through an Internet browser application.) Thus, at block 102 the user provides a first request to access the secure system that is received by the wearable user device. As discussed in further detail below, the wearable user device may include, and/or be coupled to, a non-transitory memory that includes instructions that, when executed by one or more hardware processors in the wearable user device, cause the one or more hardware processor to provide an authentication engine that perform the functionality of the wearable user device discussed below.

In one example of block 102, the user may power on the wearable user device to provide the first request to access the functionality of the wearable user device through access to its operating system. Thus, in this example, the first request to access the secure system (e.g., the wearable user device itself) is sent automatically (e.g., without any further input from the user) in response to the powering-on of the wearable user device. In another example of block 102, the user may select an application icon provided by the operating system on the wearable user device to provide the first request to access the application provided on the wearable user device. Thus, in this example, the first request to access the secure system (e.g., the application on the wearable user device) is sent automatically (e.g., without any further input from the user) in response to the user sending instructions to start an application. In another example of block 102, the user may select a function in an application provided on the wearable user device to provide the first request to access the application functionality within the application provided on the wearable user device. Thus, in this example, the first request to access the secure system (e.g., the application functionality in the application on the wearable user device) is sent automatically (e.g., without any further input from the user) in response to instructions to access a function within an application.

The method 100 then proceeds to block 104 where a plurality of authentication elements is displayed in a first authentication orientation. In response to receiving the first request to access the secure system at block 102, the wearable user device may provide a plurality of authentication elements in a first authentication orientation for display on a display device on the wearable use device that is positioned adjacent at least one eye of the user. As is known in the art, wearable user devices may include a transparent display device (e.g., an Organic Light Emitting Device (OLED) display device) that is positioned adjacent a user eye and that allows for the display of information from the wearable user device over a field-of-vision of the user. As such, the plurality of authentication elements that are displayed in the first authentication orientation may be viewable by the user along with any objects located opposite the display device from the eye of the user.

Referring now to FIG. 2a, an embodiment of an authentication screen 200 that may be provided on a display device by the wearable user device at block 104 of the method 100 is illustrated. The authentication screen 200 includes an authentication element input area 202 as well as a perimeter 204 that, in the illustrated embodiment, is spaced apart from a selection portion 202a of the authentication element input area 202. The authentication screen 200 may provide the perimeter 204 spaced apart from a selection portion 202a of the authentication element input area, as illustrated, to help prevent unintended selection of authentication elements. For example, the area between the perimeter 204 and the selection portion 202a of the authentication element input area 202 may allow the user to "drag" authentication elements towards the authentication element input area 202, discussed below, without selecting them as long as they are not dragged past the selection portion 202a of the authentication element input area 202.) However, in other embodiments, the perimeter 204 and the selection portion 202a of the authentication element input area 202 may coincide such that that the user dragging an authentication element across the perimeter 204 and into any portion of the authentication element input area 202 will result in a selection of that authentication element.

The authentication screen 200 includes a plurality of authentication elements 206a, 206b, 206c, 206d, 206e, 206f, 206g, 206h, 206i, and 206j provided in a first authentication orientation 208 about the perimeter 204. In the illustrated embodiment, the plurality of authentication elements 206a-j are numerical passcode authentication elements that include the numbers 0 through 9, which each of those numbers provided as a separate authentication element. In the illustrated embodiment, the first authentication orientation 208 provides the numerical passcode authentication elements 206a-j arranged adjacent the perimeter 204, opposite the perimeter 204 from the authentication element input area 202, and in numerical order starting with the "0" authentication element 206a at the top of the perimeter 204 and about the perimeter in a clockwise direction (e.g., followed by the "1" authentication element 206b, the "2" authentication elements 206c, and so on).

Figure 2D:
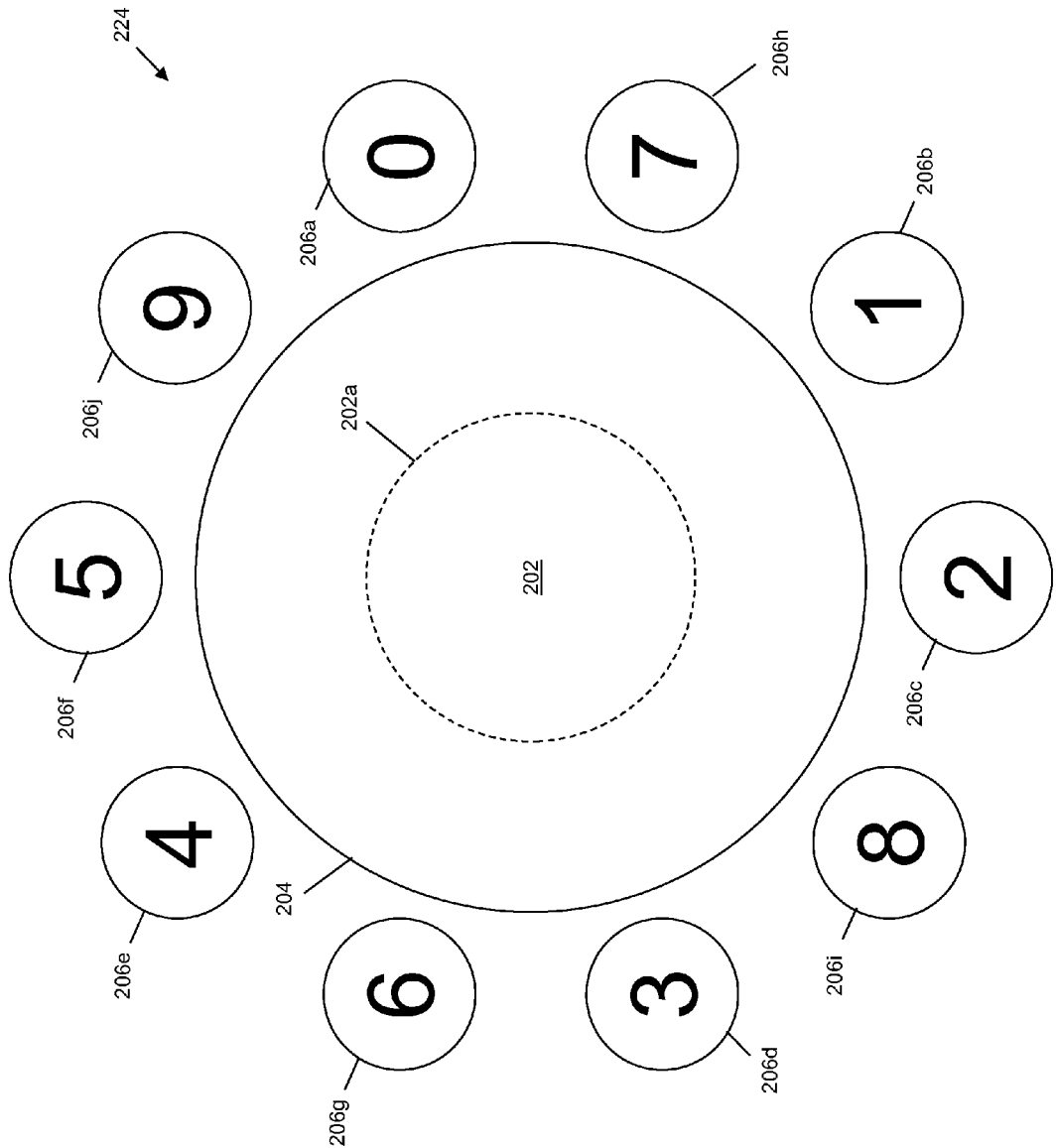
Figure 2E:
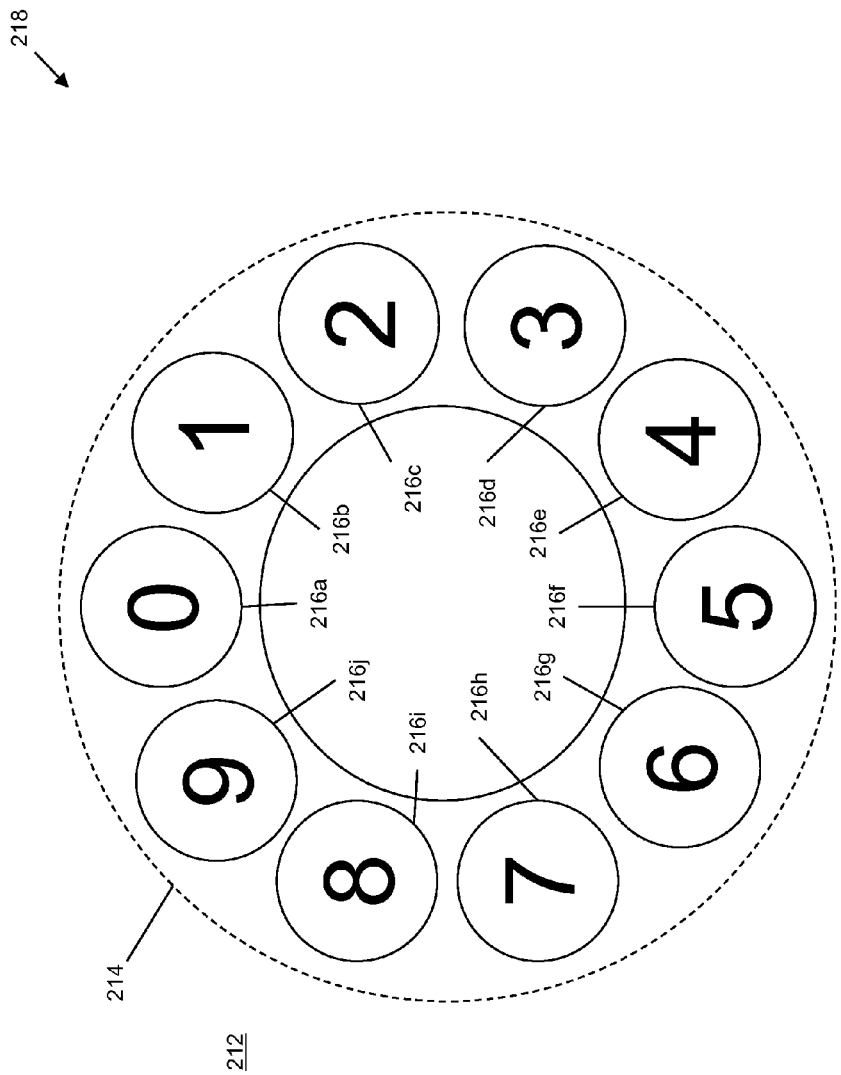
FIG. 2e is a screen shot illustrating an alternative embodiment of the display of a authentication screen on a wearable user device.
Figure 2F:
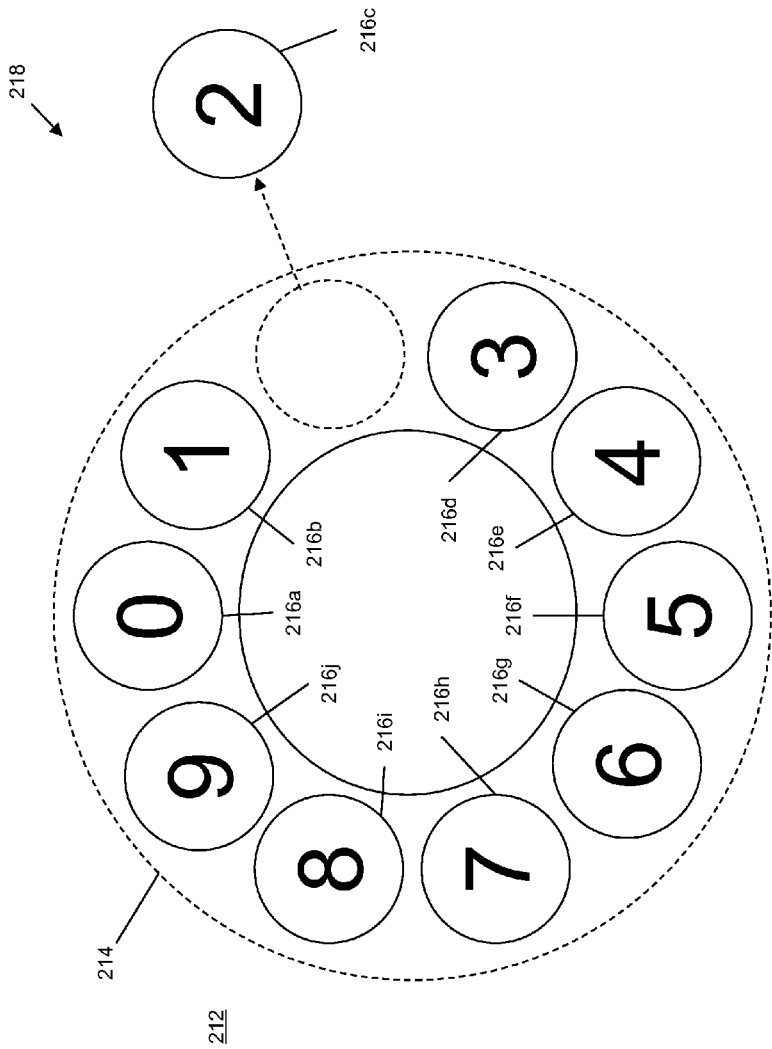
FIG. 2f is a screen shot illustrating the alternative embodiment of the authentication screen displayed on the wearable user device of FIG. 2e with an authentication element selected and input.

Referring briefly to FIG. 2e, an alternative embodiment of an authentication screen 210 that may be provided on a display device by the wearable user device at block 104 of the method 100 is illustrated. The authentication screen 210 includes an authentication element input area 212 that includes a perimeter 214. The authentication screen 210 also includes a plurality of authentication elements 216a, 216b, 216c, 216d, 216e, 216f, 216g, 216h, 216i, and 216j provided in a first authentication orientation 218 about the perimeter 214. In the illustrated embodiment, the plurality of authentication elements 216a-j are numerical passcode authentication elements that include the numbers 0 through 9, with each of those numbers provided as a separate authentication element. In the illustrated embodiment, the first authentication orientation 218 provides the numerical passcode authentication elements 206a-j arranged adjacent the perimeter 214, opposite the perimeter 214 from the authentication element input area 212, and in numerical order starting with the "0" authentication element 216a at the top of the perimeter 214 and about the perimeter 214 in a clockwise direction (e.g., followed by the "1" authentication element 216b, the "2" authentication elements 216c, and so on).

While a few examples of authentication screens, authentication elements, and authentication orientations have been provided above, a wide variety of modification to those embodiments is envisioned as falling within the scope of the present disclosure. For example, rather than, or in addition to, the numerical passcode authentications elements illustrated above, other characters may be provided as authentication elements including letters of an alphabet, symbols, and/or other characters known in the art. For example, FIG. 2g illustrates an authentication screen 217 that is substantially similar to the authentication screen 200 discussed above but with the authentication elements 206a-j provided as symbols. Furthermore, authentication elements may include images (e.g., digital photos selected from a digital photo album or provided by the user, images provided by a system provider, etc.), colors, and/or any other authentication element known in the art. While the examples of authentication orientations have been illustrated as circular around about the perimeter of a circular authentication input area, square, triangular, random, and/or any other orientation of the authentication elements may provide the same benefits as the circular orientations illustrated herein, and thus are envisioned as falling within the scope of the present disclosure.

The method 100 then proceeds to block 106 where the selection of a sequence of authentication elements is detected and recorded. In an embodiment, after being presented the plurality of authentication elements 206a-j on the display device of the wearable user device, the user may select any sequence of those authentication elements by moving their hand (or parts of their hand, discussed below) in their field of vision and opposite the display device from their eye to cause an authentication element to be selected, and then moving that selected authentication element (via movement of their hand) from its original position (e.g., as provided in FIG. 2a) to the authentication element input area 202 to cause that authentication element to be recorded as part of the sequence of authentication elements by the wearable user device.

Referring now to FIGS. 2b and 2c, an embodiment of the user selecting the authentication element 206a from the authentication screen 200 as part of a sequence of the authentication elements 206a-j selected to provide an authentication input is illustrated. As discussed above, the user may position their hand 220 opposite the display device on the wearable user device such that an authentication element is selected. As illustrated in FIG. 2b, the user is positioning a portion/index finger 220a of their hand 220 adjacent the authentication element 206a to select that authentication element 206a.

In the illustrated embodiment, portions of the authentication screen 200 are displayed to the user on the display device such that they appear "behind" the user's hand 220, index finger 220a, or arm 220b, even though they are being displayed on the display device that is positioned between the eye of the user and the user's hand 220, index finger 220a, and arm 220b. For example, in FIG. 2b a portion of the authentication element 206a is being displayed to appear behind the user's index finger 220a, portions of the authentication elements 206b, 206c, and 206d are being displayed to appear behind the users' hand 220 and arm 220c, and a portion of the perimeter 204 is being displayed to appear behind the user's hand 220 and arm 220c. Such display of the authentication screen 200 may be performed to provide the user with more natural and intuitive control in the selection of the authentication elements 260a-j and their movement to the authentication element input area 202 (i.e., users may be more comfortable if the authentication screen 200 appears to be located "behind" their hand, rather than displayed over it, when selecting authentication elements 206a-j as an authentication input).

In some embodiments, the display of portions of the authentication screen behind the user's hand 220, index finger 220a, arm 220b, and/or other authentication element selecting user features may be accomplished by capturing images or video (e.g., via a camera on the wearable user device) of the user's hand 220, index finger 220a, and arm 220b, recognizing the user's hand 220, index finger 220a, and arm 220b (e.g., using image recognition techniques known in the art), and using those recognized user features to modify the display of the authentication screen 200 such that the portions of the authentication screen 200 that would otherwise overlap the user's hand 220, index finger 220a, and arm 220b are not displayed and appear to be "covered" or otherwise "behind" the user's hand 220, index finger 220a, and arm 220b. However, in other embodiments, all of the authentication screen 200 may simply be displayed over the user's hand 220, index finger 220a, and arm 220b.

At block 106, the wearable user device may determine that the user has selected an authentication element by capturing images or video of the user's hand 220, recognizing the user's hand 220 selecting the authentication element, and associating the selected authentication element with the user hand 220. The recognition of the users hand 220 selecting the authentication element may be based on, for example, the wearable user device determining (e.g., from the captured images or video) that the user's hand 220 has been positioned adjacent the users view of that authentication element for a predetermined amount of time, the user's hand 220 performing a predetermined gesture adjacent that authentication element, and/or in a response to a variety of other user selection actions known in the art. In the illustrated example, the user has extended the index finger 220a on their hand 220 such that the index finger 220a is positioned over the authentication element 206a and, in response, the wearable user device has determined that the user is selecting the authentication element 206a (e.g., based on the index finger 220a being positioned adjacent the users view of the authentication element 206a for a predetermined time, based on the gesture of the user extending their index finger 220a and that index finger being positioned adjacent the users view of the authentication element 206a, etc.). In response to detecting that selection, the wearable user device associates the authentication element 206a with the user' hand 220 and/or index finger 220a.

Referring now to FIG. 2c, the user may then move their hand 220 to cause the authentication element that they previously selected to be moved on the authentication screen 200 into the authentication element input area 202. In the illustrated embodiment, the user has moved their hand 220, and index finger 220a along with it, such that the index finger 220a is positioned adjacent the user's view of the authentication element input area 202. Following the association of the selected authentication element 206a and the user index finger 220a discussed above, when the user moves their hand 220 and index finger 220a, the wearable user device detects that movement (e.g., via images or video captured by the camera on the wearable user device) and causes the display of the authentication element 206a to move relative to the authentication screen 200 and the authentication element input area 202. Thus, the movement by the user of their hand 220 and index finger 220a causes the display of the authentication element 206a to be "dragged" from its original position (illustrated by the dashed line in FIG. 2c) along with the hand 220 and index finger 220a of the user to the authentication element input area 202, as illustrated in FIG. 2c.

In response to the movement of the authentication element 206a to the authentication element input area 202 (performed by the wearable user device in response to the movements of the user's hand 220 and index finger 220a), the wearable user device records the authentication element 206a as a portion of an authentication input provided by the user in selecting a sequence of the authentication elements 206a-j. The recording of the authentication element based on it being in the authentication element input area 202 may occur in response to the user "holding" that authentication element in the authentication element input area 202 for a predetermined amount of time, based on a gesture of the hand 220 or index finger 220a (e.g., making a first or otherwise detracting the index finger 220a), and/or in response to a variety of other user gestures. In an embodiment, the authentication elements selected by the user may be displayed in an authentication input box 222, as illustrated.

The user may then select further authentication elements in the sequence of authentication elements selected at block 106 in substantially the same manner as discussed above for the authentication element 206a to provide different portions of an authentication input. For example, the user could follow the selection of the authentication element 206a with a selection of the authentication element 206h, followed by the selection of the authentication element 206e, following be the selection of the authentication element 206a again, and followed by the selection of any of the authentication elements 206a-j in any sequence to provide an authentication input for authenticating the user.

Referring back to FIGS. 2e and 2f, the detection and recording of the selection of the sequence of authentication elements at block 106 may be performed in substantially the same manner as described above using the alternative authentication screen 210 but with a few slight variations. Thus, the user may select the authentication element 216c in substantially the same manner as described above for the authentication element 206a on the authentication screen 200 (e.g., using their hand 220), and the wearable user device will associated that authentication element 216c with the user hand 220. The user may then move their hand 220 across their view of the perimeter 214 and into their view of the authentication element input area 212 such that the wearable user device causes the authentication element 216c to move accordingly and then record the authentication element 216c as a portion of the authentication input. Similarly as discussed above for the authentication screen 200, the selection of any of the authentication elements 216a-j in any sequence on the authentication screen 210 may be performed to provide the authentication input for authenticating the user.

The method 100 then proceeds to block 108 where the authentication input provided at block 106 is determined to match user authentication information and, in response, the user is authenticated. In an embodiment, the wearable user device includes a non-transitory memory that may include a database or other logical storage structure that includes user authentication information for authenticating a user. For example, the wearable user device may store user authentication information for authenticating a user to use the wearable user device (e.g., to access an operating system of the user device), for authenticating a user to use an application on the wearable user device, for authenticating a user to use functionality in an application on the wearable user device, for authenticating a user to access a secure device that is in communication with the wearable user device, etc. In another embodiment, the wearable user device is coupled through a network (e.g., the Internet) to a non-transitory memory that may include a database or other logical storage structure that includes user authentication information for authenticating a user. For example, the wearable user device may access user authentication information over the network for authenticating a user to use the wearable user device (e.g., to access an operating system of the user device), for authenticating a user to use an application on the wearable user device, for authenticating a user to use functionality in an application on the wearable user device, for authenticating a user to access a secure device that is in communication with the wearable user device, etc. Thus, at block 108, the wearable user device retrieves the user authentication information associated with the secure system for which the user is requesting access, and compares that user authentication information to the authentication input recorded at block 106. If the authentication input does not match the user authentication information, the user is denied access to the secure system. However, if the authentication input matches the user authentication information, the user is authenticated for the secure system. Thus, following block 108, the user may begin using the wearable user device, an application on the wearable user device, an application function in the application on the wearable user device, a secure device in communication with the wearable user device (discussed in further detail below), etc.

The method 100 may then proceed to optional block 110 where another request is received to access the secure system. Following being authenticated and granted access to the secure system in block 108, the user may need to re-authenticate with that secure system. For example, the authentication of the user provided by block 108 may expire due to a number of reasons such as, for example, the ending of an authentication time period, following a user logging off of the secure system, following user inactivity on the secure system, and/or in response to a variety of other authentication-expiration situations known in the art. In response, at block 110, the user may provide, and the wearable user device may receive, a second request to access the secure system. The second request to access the secure system may be provided by the user and received by the wearable user device in the same manner as discussed above for the first request at block 102, discussed in detail above.

The method 100 may then proceed to optional block 112 where the plurality of authentication elements is provided in an authentication orientation that is different from the first authentication orientation. Referring now to FIG. 2d, and with reference to FIG. 2a, following the second request to access the secure system at block 110, the wearable user device provides the authentication screen 200 with the authentication element input area 202, the perimeter 204, and the same authentication elements 206a-j. However, the authentication elements 206a-j are provided in a second authentication orientation 224 that is different than the first authentication orientation 208 illustrated in FIGS. 2a-c. As can be seen by a comparison of the first authentication orientation 208 and the second authentication orientation 224, each of the authentication elements 206a-j has been moved to a different position about the perimeter 204 of the authentication element input area 202. In an embodiment, the wearable user device may include a plurality of different authentication screens including the different authentication orientations of the authentication elements, may have the ability to randomize the positions of the authentication elements on an authentication screen, and/or may user a variety of other techniques for providing the different authentication orientations. With reference to the authentication screens 210 and 217 illustrated in FIGS. 2e and 2g, the authentication elements (e.g., authentication elements 216a-j in FIG. 2e) may be provided in an authentication orientation that differs from the first authentication orientation (e.g., the authentication orientation 218 in FIG. 2e) in the same manner as discussed above.

The method 100 may then proceed back to block 106 where the selection of a sequence of authentication elements is detected and recorded. The detection and recording of the selection of the sequence of authentication elements displayed in the second authentication orientation is performed substantially as described above for the detection and recording of the selection of the sequence of authentication elements displayed in the first authentication orientation, but with the provision that, due to the difference in the positions of the authentication elements in the second authentication orientation relative to the first authentication orientation, the movements of the user's hand 220 will differ even though the user is selecting the same sequence of authentication elements to provide the same authentication input. Thus, someone viewing the user providing the authentication input will be unable to falsely identify themselves as the user by copying or mimicking those user hand movements because they cannot know the orientation of the authentication elements that are being displayed to the user (i.e., because the display device on the wearable user device is only visible to the user) and because the authentication elements are unlikely to be displayed in that orientation again (i.e., due to the changing of the authentication orientation between secure system access requests).

The method 100 may then proceed back to block 108 where the wearable user device determines that the authentication input (provided using the display of the authentication elements in the second authentication orientation) matches user authentication information and authenticates the user. The method 100 may then repeat block 110, then block 112, then back to block 106, and then to block 108, as many times as the user needs to authenticate with the secure system. As such, the wearable user device may receive a third request to access the secure system and provide the authentication elements in a third authentication orientation that is different from both the first authentication orientation and the second authentication orientation, and so on. Because the wearable user device operates to change the authentication orientation of the authentication elements (e.g., every authentication orientation may be different up to the statistical limits based on the number of authentication elements used, each authentication orientation may be random, a set of authentication orientations may be cycled, etc.) across user authentications, any attempt to copy the user movements made to authenticate will not result in a false authentication, as a given set of user movements will not result in authentication for subsequent authentication orientations of the authentication elements.

Figure 3A:
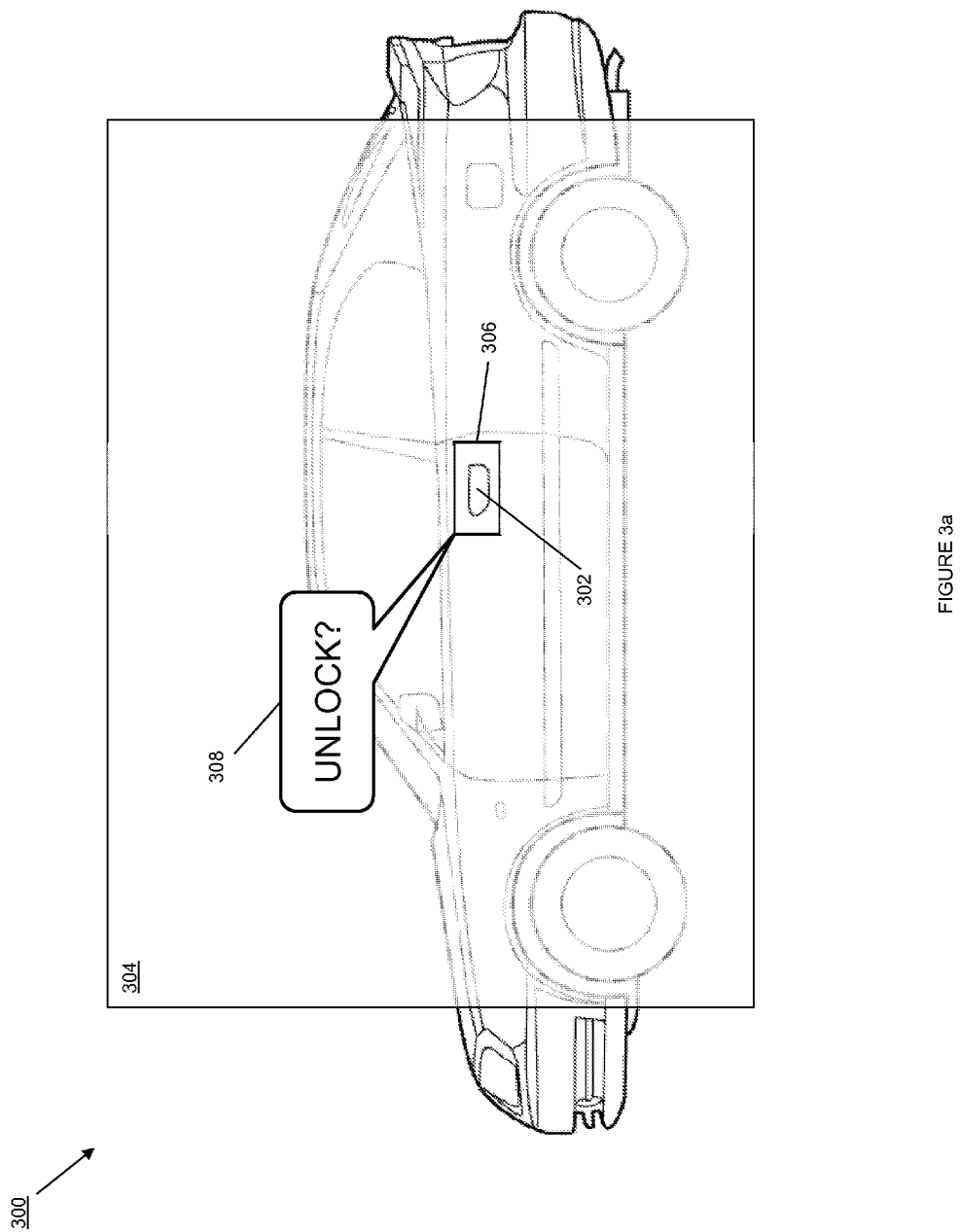
FIG. 3a is a screen shot/user field-of-vision illustrating an embodiment of a secure device detection screen displayed on a wearable user device.
Figure 3B:
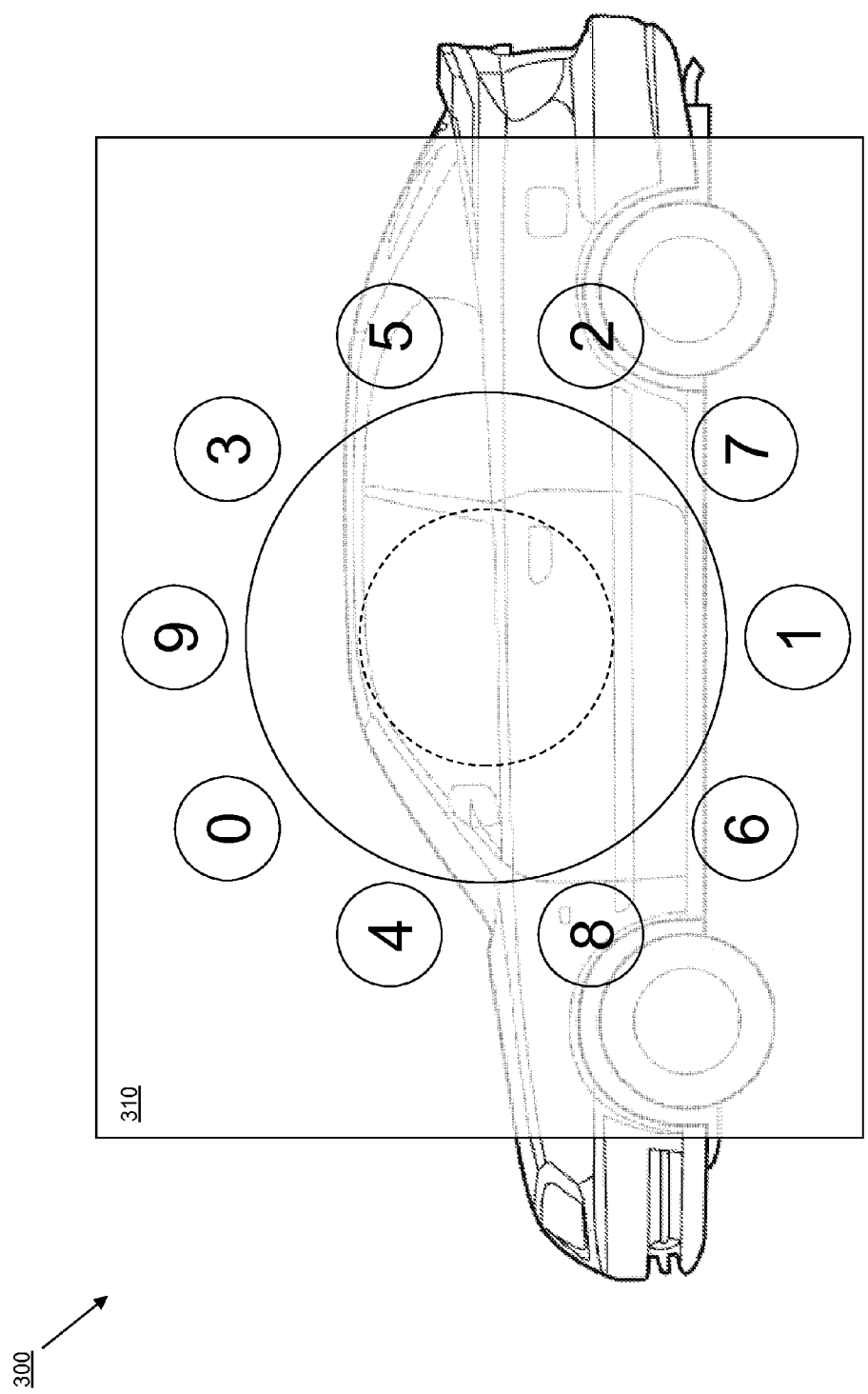

Referring now to FIGS. 3a and 3b, a specific embodiment of the wearable user device authentication system is illustrated that provides an example of how the wearable user device discussed above may be used to authenticate the user for secure devices that are in communication with the wearable user device. As discussed in further detail below, the wearable user device may include a wireless communications system that provides the wearable user device the ability to wirelessly communicate with secure systems. For example, the wearable user device may include a Bluetooth wireless controller that is configured to perform Bluetooth wireless communications, a Near Field Communication (NFC) wireless controller that is configured to perform NFC communications, a Wifi wireless controller that is configured to perform Wifi wireless communications, a cellular wireless controller that is configured to perform cellular wireless communications, and/or a variety of other wireless controllers for performing wireless communications known in the art.

FIG. 3a illustrates a secure system 300 that, in the illustrated embodiment, includes a car with a secure device 302 that includes a door lock. In an embodiment, the secure system 300/car and/or the secure device 302/door lock are configured to wirelessly communicate with the wearable user device (e.g., using a wireless controller similar to those discussed above as being included in the wearable user device), and a user of the wearable user device and the secure system 300/car may configure both to communicate to authenticate the user for the secure system 300/car using the wearable user device. For example, the user may program the wearable user device with authentication information for the secure system 300/car.

FIG. 3a illustrates a user's field-of-view upon approaching the secure system 300/car and following an initial communication between the wearable user device and the secure system 300/car. For example, in response to the user bringing the wearable user device within a wireless communication range of the secure system 300/car, the wearable user device and the secure system 300/car may begin communicating using wireless communication techniques known in the art (e.g., via Bluetooth communication, NFC communication, Wifi communications, cellular communications, etc.). The initial communications between the wearable user device and the secure system 300/car may include each identifying itself and confirming the identity of the other. For example, the wearable user device may receive an identification from the secure system 300/car and then use that identification to determine whether the secure system 300/car is associated with user authentication information in a database, discussed above. In another example, the wearable user device may receive information that may be used to determine where in the user's field of view the secure device 302/door lock is located, and/or a variety of other information about the secure system 300/car and/or secure device 302/lock.

In response to the secure system 300/car being associated with user authentication information in a database, the wearable use device may display a secure device detection screen 304 on its display device. In the embodiment illustrated in FIG. 3a, the secure device detection screen 304 is displayed such that the secure system 300/car that is in the user's field of view and opposite the display device from the user's eye is visible through the secure device detection screen 304. An indication window 306 is provided on the secure device detection screen 304 that indicates the secure device 302/door lock (e.g., the location of the secure device 302 in the users field of view), and a user prompt 308 is provided to indicate to the user that they may access the secure system 300/car through the secure device 302/door lock by authenticating using the wearable user device. For example, the user may be able to speak the word "unlock" in order to provide the request to access the secure system 300/car (discussed above with reference to blocks 102 and 110 of the method 100).

Referring now to FIG. 3b, in response to receiving the request to access the secure system 300/car, the wearable user device may provide an authentication screen 310, which is substantially similar to the authentication screen 200, discussed above with reference to FIGS. 2a-2c, and the user may interact with the authentication screen 310 substantially as described above with reference to the method 100 in order to provide an authentication input for authentication by the wearable user device. In response to authenticating the user as described above with reference to block 108 of the method 100, the wearable user device may wirelessly communicate an instruction to the secure system 300/car to provide access to the user. For example, in the illustrated embodiment, the instruction to the secure system 300/car to provide access to the user may include an instruction to unlock the secure device 302/door lock such that the user may access the secure system 300/car. As discussed above, subsequent attempts to access the secure system 300 will result in the orientation of the authentication elements on the authentication screen 310 being changed such that user hand movements and gestures to provide an authentication input are different and cannot be copied by another who has viewed them to falsely authenticate with and use the secure system 300/car.

While the use of the wearable user device to authenticate a user and unlock a car door has been illustrated and described, a wide variety of secure systems and secure devices in wireless communication with the wearable user device will benefit from the authentication system described herein. For example, with reference to the secure system 300/car of FIGS. 3a and 3b, user authentication may provide for unlocking of the trunk of the car, starting the ignition of the car, and/or providing a variety of other car actions known in the art. In such an example, indication windows and use prompts may be provided that are similar to the indication window 306 and user prompt 308 of FIG. 3a to indicate secure devices that the user may authenticate for (e.g., an indication window indicating the trunk may be unlocked along with a user prompt to "unlock trunk", an indication window indicating the ignition may be started along with a user prompt to "start ignition", etc.). In another example, the secure system may be a home and the secure devices may be one or more doors in the home, a safe in the home, and/or a variety of other home secure devices known in the art. In another example, the secure system may be a computer and the secure device may be any components connected to that computer. Thus, one of skill in the art in possession of the present disclosure will recognize that a wide variety of secure systems and secure devices known in the art may have a user authenticated for them using the systems and methods discussed herein.

Thus, systems and methods for authenticating a user using a wearable user device have been described that allow a user to provide an authentication input using hand movements and gestures that manipulate authentication elements displayed on a display device that is only visible to the user. On subsequent authentications, the authentication orientation of the authentication elements is changed so that when the user provides the same authentication input, different hand movements and gestures will be used. As such, the hand gestures and movements are not subject to copying to provide a false authentication by anyone that has viewed them or recorded them, as the hand gestures and movements needed for authentication will differ based on the differing authentication orientations provided for the authentication elements.

Figure 4:
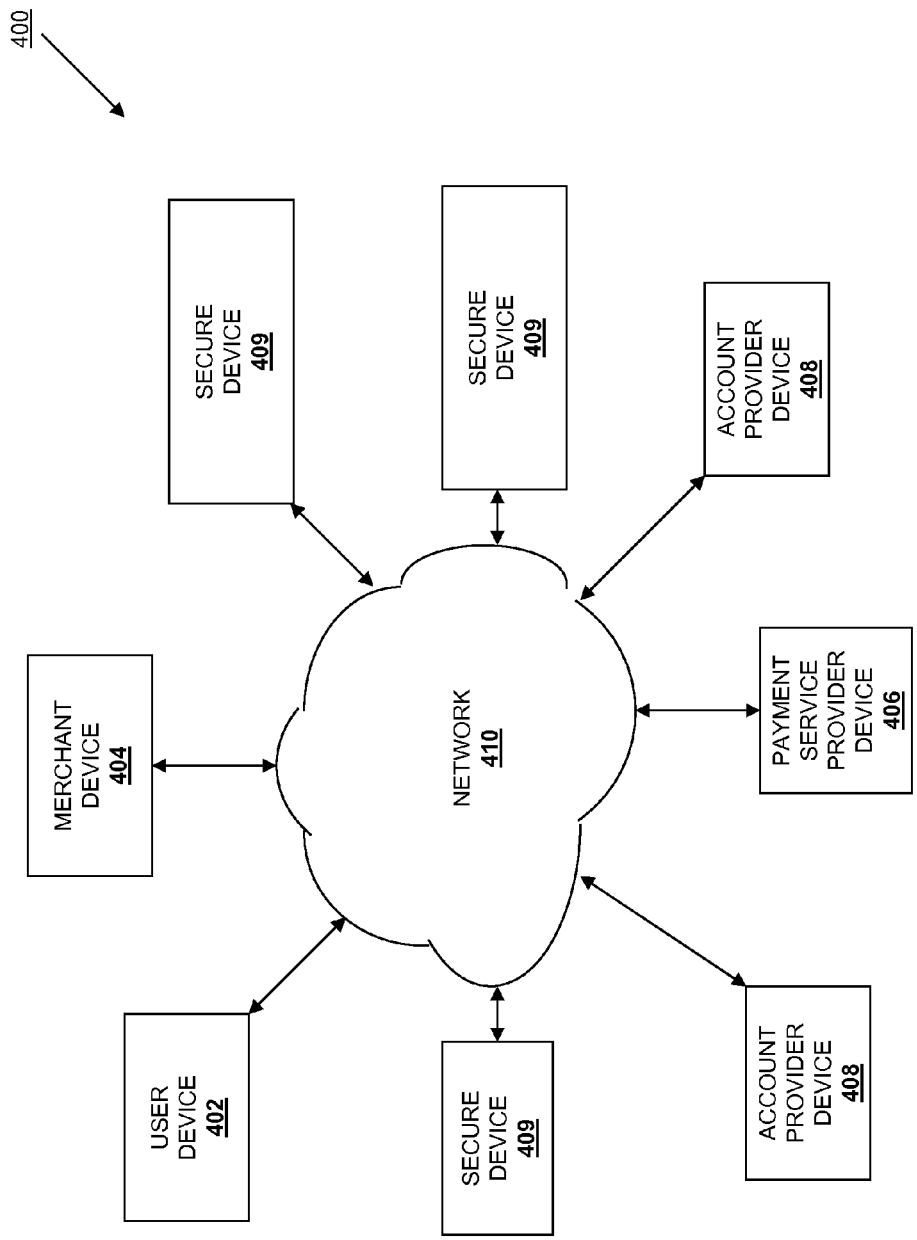
FIG. 4 is a schematic view illustrating an embodiment of a networked system.

Referring now to FIG. 4, an embodiment of a network-based system 400 for implementing one or more processes described herein is illustrated. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 400 illustrated in FIG. 4 includes a user device 402, a merchant device 404, a payment service provider device 406, a plurality of account provider devices 408, and a plurality of secure devices 409 in communication over a network 410. Any of the user devices 402 may be the wearable user devices, discussed above. The merchant device 404 may be the merchant devices discussed above and may be operated by the merchants discussed above. The payment service provider device 406 may be the payment service provider devices discussed above and may be operated by a payment service provider such as, for example, PayPal Inc. of San Jose, Calif. The account provider devices 408 may be the account provider devices discussed above and may be operated by the account providers discussed above such as, for example, credit card account providers, bank account providers, savings account providers, and a variety of other account providers known in the art. The secure devices 409 may be secure systems and/or devices, discussed above The user device 402, merchant device 404, payment service provider device 406, plurality of account provider devices 408, and plurality of secure devices 409 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 410.

The network 410 may be implemented as a single network or a combination of multiple networks. For example, in various embodiments, the network 410 may include the Internet and/or one or more intranets, landline networks, wireless networks, and/or other appropriate types of networks.

The user device 402 may be implemented using any appropriate combination of hardware and/or software configured for wired and/or wireless communication over network 410. For example, in one embodiment, the user device 402 may be implemented as a personal computer of a user in communication with the Internet.

The user device 402 may include one or more browser applications which may be used, for example, to provide a convenient interface to permit the payer to browse information available over the network 410. For example, in one embodiment, the browser application may be implemented as a web browser configured to view information available over the Internet.

The user device 402 may also include one or more toolbar applications which may be used, for example, to provide user-side processing for performing desired tasks in response to operations selected by the user. In one embodiment, the toolbar application may display a user interface in connection with the browser application.

The user device 402 may further include other applications as may be desired in particular embodiments to provide desired features to the user device 402. In particular, the other applications may include a payment application for payments assisted by a payment service provider through the payment service provider device 406. The other applications may also include security applications for implementing user-side security features, programmatic user applications for interfacing with appropriate application programming interfaces (APIs) over the network 410, or other types of applications. Email and/or text applications may also be included, which allow the user to send and receive emails and/or text messages through the network 410. The user device 402 includes one or more user and/or device identifiers which may be implemented, for example, as operating system registry entries, cookies associated with the browser application, identifiers associated with hardware of the user device 402, or other appropriate identifiers, such as a phone number. In one embodiment, the user identifier may be used by the payment service provider device 406 and/or account provider device 408 to associate the user with a particular account as further described herein.

The merchant device 404 may be maintained, for example, by a conventional or on-line merchant, conventional or digital goods seller, individual seller, and/or application developer offering various products and/or services in exchange for payment to be received conventionally or over the network 410. In this regard, the merchant device 404 may include a database identifying available products and/or services (e.g., collectively referred to as items) which may be made available for viewing and purchase by the user.

The merchant device 404 also includes a checkout application which may be configured to facilitate the purchase by the payer of items. The checkout application may be configured to accept payment information from the user through the user device 402, the account provider through the account provider device 408, and/or from the payment service provider through the payment service provider device 406 over the network 410.

Figure 5:
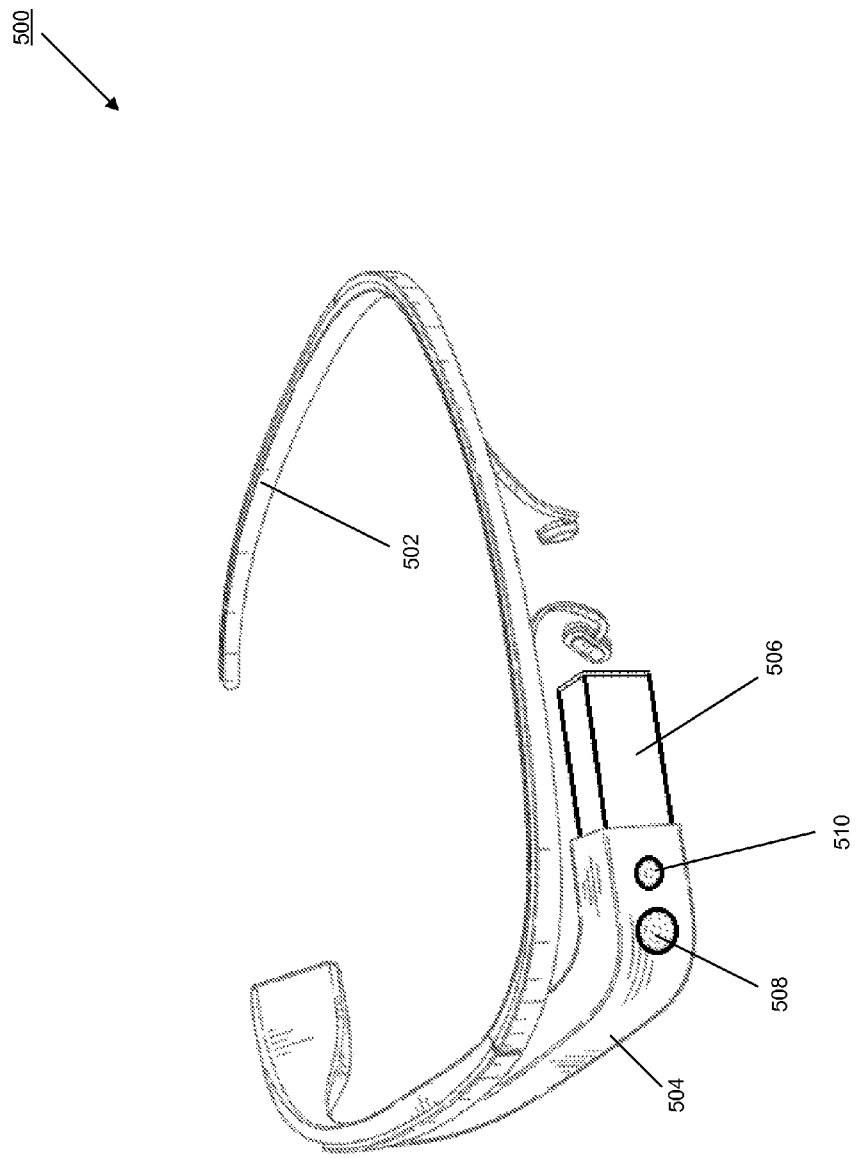
FIG. 5 is a perspective view illustrating an embodiment of a wearable user device.

Referring now to FIG. 5, an embodiment of a wearable user device 500 is illustrated. The wearable user device 500 may be the may be the wearable user devices, discussed above. The wearable user device 500 includes a frame 502 having a computing chassis 504 that extends from the frame 502, a display device 506 that extends from the computing chassis 504, a microphone 508 located on the computing chassis 504, and a camera located on the computing chassis 504. One of skill in the art will recognize that the wearable user device 500 is a mobile wearable user device such as, for example, Google Glass® available from Google Inc. of Mountain View, Calif. that may provide a user with the functionality discussed above with reference to the method 100. However, a variety of other mobile wearable user devices may be used in the method 100 without departing from the scope of the present disclosure.

Figure 6:
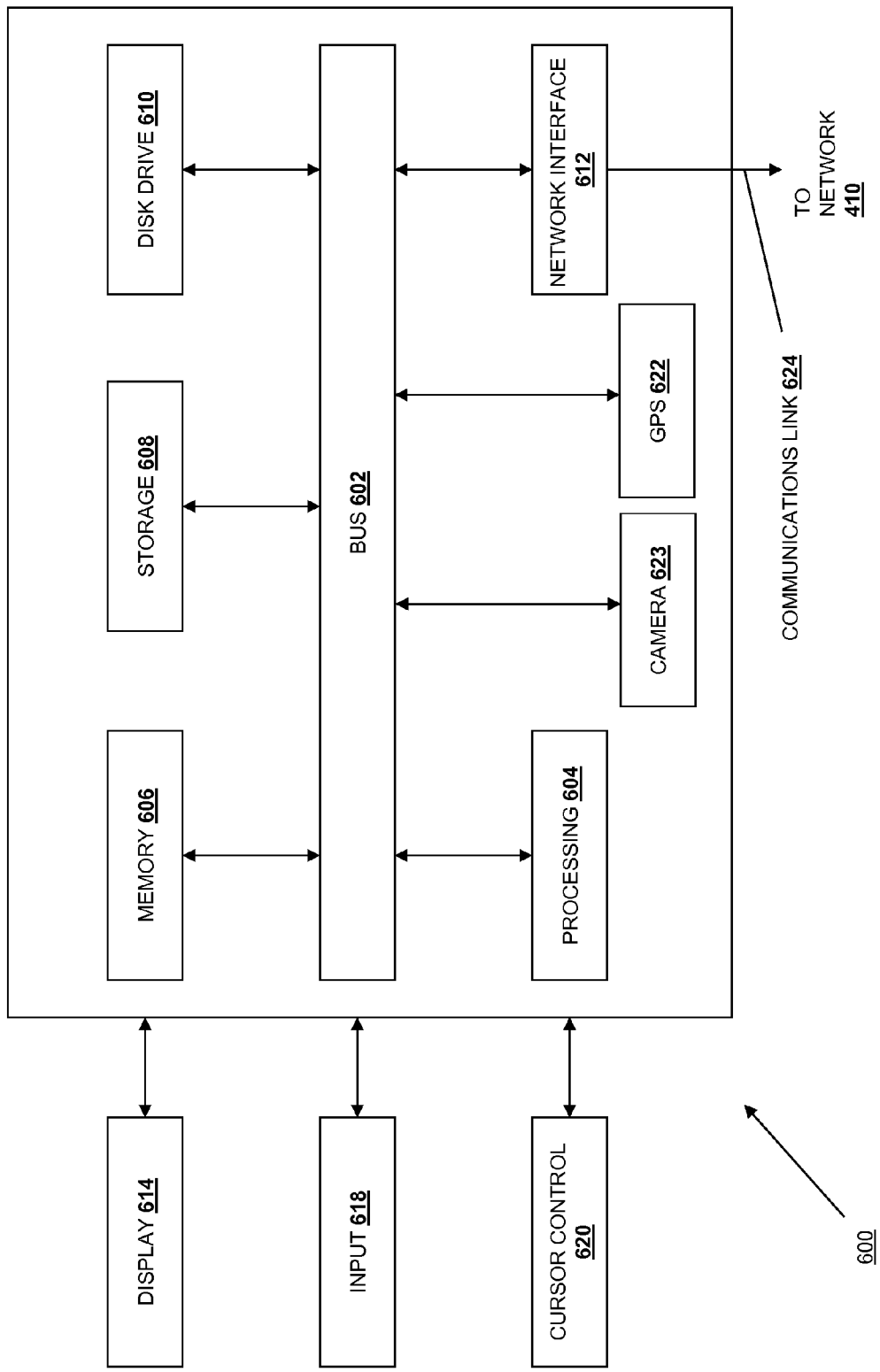
FIG. 6 is a schematic view illustrating an embodiment of a computer system.

Referring now to FIG. 6, an embodiment of a computer system 600 suitable for implementing, for example, user devices 402 or 500, merchant device 404, payment service provider device 406, plurality of account provider devices 408, and/or plurality of secure devices 409, is illustrated. It should be appreciated that other devices utilized by users, merchants, payment service providers, and account providers in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices known in the art.) In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the user device 402 or 500, merchant device 404, payment service provider device 406, plurality of account provider devices 408, and/or plurality of secure devices 409. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 410 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Figure 7:
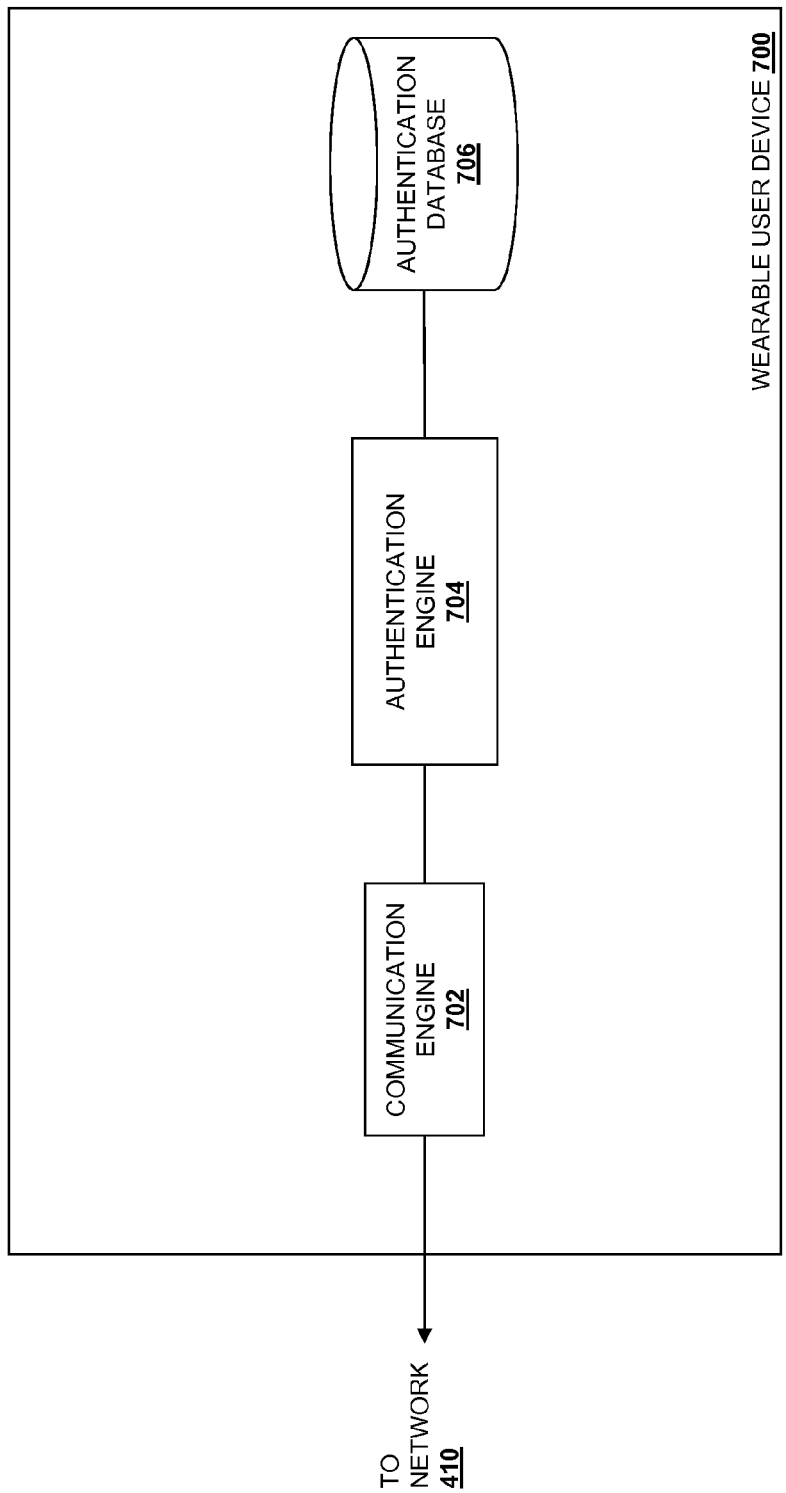
FIG. 7 is a schematic view illustrating an embodiment of a wearable user device.

Referring now to FIG. 7, an embodiment of a wearable user device 700 is illustrated. In an embodiment, the device 700 may be the wearable user devices 402 or 500. The device 700 includes a communication engine 702 that is coupled to the network 410 and to an authentication engine 704 that is coupled to an authentication database 706. The communication engine 702 may be software or instructions stored on a computer-readable medium that allows the device 700 to send and receive information over the network 410. The authentication engine 704 may be software or instructions stored on a computer-readable medium that is operable to receive requests to access a secure system, display authentication elements in any number of orientations, change authentication orientations (e.g., based on instructions in the authentication database 706), detect selection of authentication elements, associated selected authentication elements with a user's hand, move selected authentication elements in response to detected user hand movements, record selected authentication elements, determine that authentication inputs match user authentication information in the authentication database 702, communicate with secure systems and devices, and provide any of the other functionality that is discussed above. While the database 706 has been illustrated as located in the wearable user device 700, one of skill in the art will recognize that it may be connected to the authentication engine 704 through the network 410 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An authentication system, comprising:
a non-transitory memory storing user authentication information; and
one or more hardware processors coupled to the memory and operable to read instructions from the memory to perform the steps of:
receiving, by a wearable user device, a first request from a user to access a secure system;
displaying, to a user eye of the user on a display device of the wearable user device, a plurality of authentication elements in a first authentication orientation about a perimeter of an authentication element input area;
detecting, by a camera on the wearable user device, a user hand of the user that is located opposite the display device from the user eye of the user selecting a sequence of the plurality of authentication elements and, for each selected authentication element in the sequence:
associating the selected authentication element with the user hand;
moving the selected authentication element on the display device of the wearable user device based on a detected movement of the user hand; and
recording the selected authentication element as a portion of an authentication input in response to moving the selected authentication element to the authentication element input area;
determining that an authentication input, which includes each portion of the authentication input that was recorded, matches the user authentication information in the non-transitory memory and, in response, authenticating the user for the secure system;

receiving, by the wearable user device, a second request to access the secure system; and displaying the plurality of authentication elements in a second authentication orientation about the perimeter of the authentication element input area on the display device of the wearable user device, wherein the second authentication orientation is different from the first authentication orientation.

2. The authentication system of claim 1, wherein the one or more hardware processors are operable to read instructions from the memory to perform the steps of:

receiving, by the wearable user device, a third request to access the secure system; and displaying the plurality of authentication elements in a third authentication orientation about the perimeter of the authentication element input area on the display device of the wearable user device, wherein the third authentication orientation is different from the first authentication orientation and the second authentication orientation.

3. The authentication system of claim 1, wherein the secure system includes an operating system of the wearable user device.

4. The authentication system of claim 1, wherein the secure system includes an application provided by an operating system on the wearable user device.

5. The authentication system of claim 1, wherein the secure system includes a secure device that is in wireless communication with the wearable user device and that is located opposite the display device from the user eye of the user.

6. The authentication system of claim 5, wherein the one or more hardware processors are operable to read instructions from the memory to perform the steps of:

communicating wirelessly with the secure device and, in response, recognizing that the secure device is associated with the user in the non-transitory memory;

displaying, to the user eye of the user on the display device of the wearable user device, a secure device detection screen that indicates the secure device; and in response to receiving a secure device authentication command, displaying the plurality of authentication elements.

7. A method for authenticating a user comprising:

receiving, by a wearable user device, a first request from a user to access a secure system;

displaying, to a user eye of the user on a display device of the wearable user device, a plurality of authentication elements in a first authentication orientation about a perimeter of an authentication element input area;

detecting, by a camera on the wearable user device, a user hand of the user that is located opposite the display device from the user eye of the user selecting a sequence of the plurality of authentication elements and, for each selected authentication element in the sequence:

associating the selected authentication element with the user hand;

moving the selected authentication element on the display device of the wearable user device based on a detected movement of the user hand; and recording the selected authentication element as a portion of an authentication input in response to moving the selected authentication element to the authentication element input area;

determining that an authentication input, which includes each portion of the authentication input that was recorded, matches a user authentication information in a database and, in response, authenticating the user for the secure system;

receiving, by the wearable user device, a second request to access the secure system; and displaying the plurality of authentication elements in a second authentication orientation about the perimeter of the authentication element input area on the display device of the wearable user device, wherein the second authentication orientation is different from the first authentication orientation.

8. The method of claim 7, further comprising:

receiving, by the wearable user device, a third request to access the secure system; and displaying the plurality of authentication elements in a third authentication orientation about the perimeter of the authentication element input area on the display device of the wearable user device, wherein the third authentication orientation is different from the first authentication orientation and the second authentication orientation.

9. The method of claim 7, wherein the secure system includes an operating system of the wearable user device.

10. The method of claim 7, wherein the secure system includes an application provided by an operating system on the wearable user device.

11. The method of claim 7, wherein the secure system includes a secure device that is in wireless communication with the wearable user device and that is located opposite the display device from the user eye of the user.

12. The method of claim 11, further comprising:

communicating wirelessly with the secure device and, in response, recognizing that the secure device is associated with the user in the database;

displaying, to the user eye of the user on the display device of the wearable user device, a secure device detection screen that indicates the secure device; and in response to receiving a secure device authentication command, displaying the plurality of authentication elements.

13. The method of claim 12, wherein the authenticating the user for the secure system that includes the secure device includes sending an instruction wirelessly to the secure device to unlock a lock.

14. A non-transitory machine-readable medium comprising a plurality of machine-readable instructions which, when executed by one or more processors, are adapted to cause the one or more processors to perform a method comprising:

receiving, by a wearable user device, a first request from a user to access a secure system;

displaying, to a user eye of the user on a display device of the wearable user device, a plurality of authentication elements in a first authentication orientation about a perimeter of an authentication element input area;

detecting, by a camera on the wearable user device, a user hand of the user that is located opposite the display device from the user eye of the user selecting a sequence of the plurality of authentication elements and, for each selected authentication element in the sequence:

associating the selected authentication element with the user hand;

moving the selected authentication element on the display device of the wearable user device based on a detected movement of the user hand; and recording the selected authentication element as a portion of an authentication input in response to moving the selected authentication element to the authentication element input area;

determining that an authentication input, which includes each portion of the authentication input that was recorded, matches a user authentication information in a database and, in response, authenticating the user for the secure system;

receiving, by the wearable user device, a second request to access the secure system; and displaying the plurality of authentication elements in a second authentication orientation about the perimeter of the authentication element input area on the display device of the wearable user device, wherein the second authentication orientation is different from the first authentication orientation.

15. The non-transitory machine-readable medium of claim 14, wherein the method further comprises:

receiving, by the wearable user device, a third request to access the secure system; and displaying the plurality of authentication elements in a third authentication orientation about the perimeter of the authentication element input area on the display device of the wearable user device, wherein the third authentication orientation is different from the first authentication orientation and the second authentication orientation.

16. The non-transitory machine-readable medium of claim 14, wherein the secure system includes an operating system of the wearable user device.

17. The non-transitory machine-readable medium of claim 14, wherein the secure system includes an application provided by an operating system on the wearable user device.

18. The non-transitory machine-readable medium of claim 14, wherein the secure system includes a secure device that is in wireless communication with the wearable user device and that is located opposite the display device from the user eye of the user.

19. The non-transitory machine-readable medium of claim 18, wherein the method further comprises:

communicating wirelessly with the secure device and, in response, recognizing that the secure device is associated with the user in the database;

displaying, to the user eye of the user on the display device of the wearable user device, a secure device detection screen that indicates the secure device; and in response to receiving a secure device authentication command, displaying the plurality of authentication elements.

20. The non-transitory machine-readable medium of claim 14, wherein the authenticating the user for the secure system that includes the secure device includes sending an instruction wirelessly to the secure device to unlock a lock.

* * * * *